(No Model.)

W. W. KENFIELD.
CULINARY UTENSIL.

No. 254,141.   Patented Feb. 28, 1882.

WITNESSES

INVENTOR
William W. Kenfield
by C. A. Snow & Co.
Attorneys

UNITED STATES PATENT OFFICE.

WILLIAM W. KENFIELD, OF CANANDAIGUA, NEW YORK.

CULINARY UTENSIL.

SPECIFICATION forming part of Letters Patent No. 254,141, dated February 28, 1882.

Application filed October 29, 1881. (No model.)

*To all whom it may concern:*

Be it known that I, WILLIAM W. KENFIELD, of Canandaigua, in the county of Ontario and State of New York, have invented certain new and useful Improvements in Culinary Utensils; and I do hereby declare that the following is a full, clear, and exact description of the invention, which will enable others skilled in the art to which it appertains to make and use the same, reference being had to the accompanying drawings, which form a part of this specification.

This invention relates to culinary utensils, such as kettles, tea and coffee pots, saucepans, and the like; and it consists more particularly of certain improvements in the bottoms for the same, whereby the strength is greatly increased, a larger heating-surface gained, and a rim or flange provided by which the bottom is raised and prevented from being burned out when placed directly upon a hot stove, as will be hereinafter more fully described, and particularly pointed out in the claim.

Figure 1:
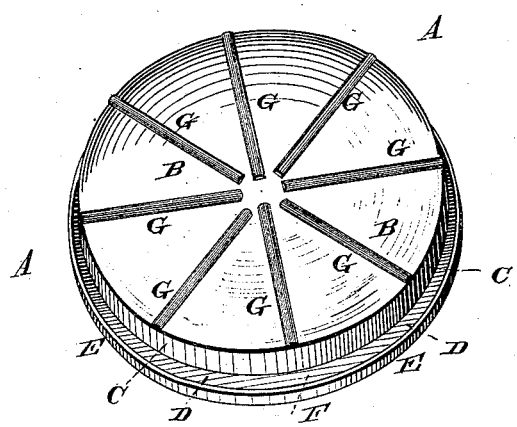
Figure 2:
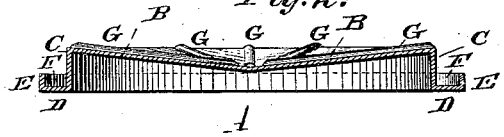

In the drawings hereto annexed, Figure 1 is a perspective view of my improved bottom for culinary utensils. Fig. 2 is a vertical sectional view of the same, and Fig. 3 is a vertical sectional view of a vessel having my improved bottom.

Corresponding parts in the several figures are denoted by like letters of reference.

My improved bottom, which in the drawings is represented by letter A, may be and is preferably spun, stamped, pressed, or otherwise formed of a single piece of sheet metal, and it consists of a disk, B, usually circular in shape, provided with a vertical downwardly-extending rim, C, having an outward-projecting horizontal flange, D, provided with an upward-projecting narrow rim, E, so as to form a circumferential groove or gutter, F. The disk or bottom B is V-shaped in cross-section, as clearly shown in the sectional views, Figs. 2 and 3, and it is provided with radial corrugations G extending from the extreme edge of the disk downwardly to a point near the center thereof, which not only greatly add to the strength but also increase the heating-surface of the bottom.

Figure 3:
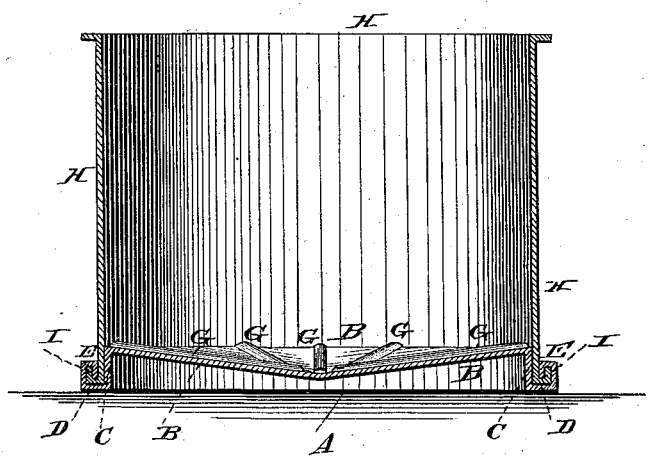

H in Fig. 3 represents the body of a culinary vessel provided with my improved bottom. Said body is provided at its lower edge with a bead, I, which is adjusted in the groove F of the bottom. The rim E is then turned or clinched over the bead I, thus connecting or securing the bottom firmly to the base of the body. Solder may be used in order to insure a perfectly-tight joint; but this is not essential.

By this invention it will be seen that the bottom proper, or disk B, is raised above the lower edge of the vessel, so that only the horizontal flange D comes in direct contact with the stove upon which the vessel may be placed, the advantage of which is obvious.

Owing to the flange D being horizontal instead of curved, as heretofore, a greater bearing-surface is presented to the stove at the point most able to bear the heat, which greatly increases the durability of the utensil. The V-shaped construction of the bottom, in contradistinction to a $\wedge$-shaped bottom, as heretofore constructed, enables me to obtain all the advantages in point of strength and durability, and at the same time bring the disk or bottom, especially the central portion thereof, nearer the stove, where it will more rapidly become heated. By extending the corrugations to the extreme edge of the disk I strengthen the point where it is most liable to bend or break—to wit, the point of connection between the disk and vertical rim C.

By my invention a durable and convenient utensil may be constructed at a cost not exceeding that of the common ones now in use.

I am aware of the patents to Fancher, June 21, 1881, Scaife, April 20, 1875, and Hill, May 28, 1878, and I claim nothing therein shown.

Having thus described my invention, I claim and desire to secure by Letters Patent of the United States—

The herein-described bottom for culinary utensils, consisting of a disk V shaped in cross-section, and provided with radial grooves extending from the extreme edge of the disk downwardly to a point near the center thereof, circumferential downwardly-extending vertical rim C, horizontal flange D, and upwardly-projecting rim E, substantially as and for the purpose specified.

In testimony that I claim the foregoing as my own I have hereto affixed my signature in presence of two witnesses.

WILLIAM W. KENFIELD.

Witnesses:
 ELBRIDGE G. WEST,
 IRVING W. JACQUEWAY.